United States Patent
Lingamallu et al.

(10) Patent No.: US 10,587,603 B2
(45) Date of Patent: Mar. 10, 2020

(54) ZERO SIGN-ON USING A WEB BROWSER

(71) Applicant: Centrify Corporation, Santa Clara, CA (US)

(72) Inventors: Anil Lingamallu, Bellevue, WA (US); Nate Yocom, Bellevue, WA (US); Paul Moore, Bellevue, WA (US); Fei Chen, Bellevue, WA (US)

(73) Assignee: IDAPTIVE, LLC, Wilmington, DE (US)

( * ) Notice: Subject to any disclaimer, the term of this patent is extended or adjusted under 35 U.S.C. 154(b) by 553 days.

(21) Appl. No.: 15/240,962

(22) Filed: Aug. 18, 2016

(65) Prior Publication Data

US 2018/0054434 A1  Feb. 22, 2018

(51) Int. Cl.
  *H04L 29/06*  (2006.01)
  *G06F 21/44*  (2013.01)
  *H04L 29/08*  (2006.01)
  *G06F 21/33*  (2013.01)

(52) U.S. Cl.
  CPC .......... *H04L 63/0823* (2013.01); *G06F 21/33* (2013.01); *G06F 21/44* (2013.01); *H04L 63/083* (2013.01); *H04L 63/0815* (2013.01); *H04L 63/0861* (2013.01); *H04L 67/02* (2013.01); *G06F 2221/2103* (2013.01); *H04L 2463/082* (2013.01)

(58) Field of Classification Search
  CPC . H04L 63/0823; H04L 63/0815; G06F 21/33; G06F 21/44

USPC .............................................. 726/7
  See application file for complete search history.

(56) References Cited

U.S. PATENT DOCUMENTS

| | | | | |
|---|---|---|---|---|
| 2003/0014629 A1* | 1/2003 | Zuccherato | ........... | H04L 9/3268 713/156 |
| 2013/0247164 A1* | 9/2013 | Hoggan | ................ | H04W 12/06 726/8 |
| 2014/0066015 A1* | 3/2014 | Aissi | ..................... | H04W 12/06 455/411 |

* cited by examiner

Primary Examiner — Malcolm Cribbs
Assistant Examiner — Angela R Holmes
(74) Attorney, Agent, or Firm — Womble Bond Dickinson (US) LLP

(57) ABSTRACT

Method for enabling zero sign-on (ZSO) through a standard web browser. The device running the browser is first enrolled with a web service using an installed enrollment agent on the device which authenticates a user of the device. After authentication, the enrollment agent stores a device profile that includes a user certificate for the user and an authority certificate issued by said web service. The device profile is stored at a device location accessible by each of the web browsers used by said device. The enrollment agent configures each of the web browsers on the device to respond correctly to ZSO certificate challenges from the web service. Once enrolled, the device's web browsers can respond correctly to a ZSO Uniform Resource Locator (URL) certificate challenge received from the web service. After a successful response to the challenge, the browser is granted a secure socket layer (SSL) connection.

15 Claims, 2 Drawing Sheets

ZERO SIGN-ON USING A WEB BROWSER

FIELD OF THE INVENTION

The invention is directed to techniques for enabling a user to securely sign on to a web-based service using a web browser and user certificates, while eliminating the authorization steps the user needs to take to initiate a secure session, commonly referred to as zero sign-on (ZSO).

BACKGROUND

When a browser user connects to a web service with a secure connection necessary for confidential data exchange, the browser and web service use a Secure Socket Layer (SSL) connection that is typically indicated in a uniform resource locator (URL) by the prefix "https:" The SSL connection requires user authentication before the connection is established. That authentication might require direct user action: entering a username and password. In lieu of username and password, the authentication can also be satisfied by a user certificate issued earlier by the web site or another source and stored by the browser. When the web service asks for authentication, the browser supplies the user certificate so the user does not have to enter a username and password.

Certificate Authorities:

User certificates must be certified by a certificate authority that is recognized by the web service to guarantee authenticity. A user certificate is accompanied by an authority certificate that identifies the authority guaranteeing the user certificate. If the web service does not recognize the certificate authority, it will not accept the user certificate, and thereby prevent the user from connecting to the web service via SSL.

A set of standard public certificate authorities guarantees most user certificates. Because the public certificate authorities are well known and reliable, a web service can rely on their guarantees. Some organizations may, however, create their own certificate authority to guarantee user certificates that are used only within the organization. The organization's web services recognize user certificates guaranteed by their own certificate authority, but outside web services will not recognize the user certificate's authority and so will not accept the user certificates created by the organization's certificate authority.

Certificate Trust Lists:

A browser can accumulate multiple user certificates as it subscribes to different secure web services. When a user requests connection to a secure web service, the web service requests a user certificate, but the browser may not know which certificate to supply, so it must ask the user to identify the correct certificate from a list of certificates.

To help reduce the list of certificates, a web service may—when it asks for a user certificate—provide a hint that contains a certificate trust list (CTL). A CTL is a list of certificate authorities that the web service will accept. Many browsers will accept a CTL hint, examine the authority list, and return only the certificates authorized by authorities in the list.

Device Management Systems:

A device management system is used to both enroll devices such as desktop computers, notebook computers, tablets and mobile smart phones, and allow enrolled devices to access secure web services. The following description refers to mobile device management (MDM) systems since easy user authentication with strong security is particularly important for MDM systems that control the access of mobile devices such as cell phones, tablets and notebook computers to web services such as SaaS applications (Software as a Service—Dropbox® or Salesforce®, for example). However, device management systems for desktop computers and other devices to web services such as SaaS applications work in essentially the same way. Therefore, although referenced as an MDM system, the described system is not limited to use with mobile devices but works in the same manner with desktop computers and the like.

An MDM system sets up user access to an MDM service. Access occurs through a connecting application on a device, the application providing a secure connection to the MDM service. Once the connecting application is connected, it provides user access to multiple SaaS applications and other web services. The MDM system handles complete authentication and authorization for the user to access the SaaS applications or other secure web services to which authorization has been granted from that device.

Single Sign-on (SSO) Versus Zero Sign-on (ZSO):

When the user begins a session with an MDM service, he signs onto the service through a connecting application running on his device. The user provides a username and password, and then has complete access to the other authorized SaaS applications or other secure web services without further sign-on. This feature is called single sign-on (SSO): the user signs onto the MDM service only once per session. No further sign-ons are required to access other secure services through the MDM service. If the user quits the MDM service, the user will need to sign on once again with username and password to start a new session.

Zero sign-on (ZSO) goes one step further: it requires no sign-on for a secure MDM service session. The connecting application is first set up through a secure connection with the MDM service, which typically occurs at the user's request, at which time the user provides a username and password. The MDM service sets up the connecting application so that the MDM service will recognize the connecting application whenever it requests a new session with the MDM service. The MDM service grants a secure connection to the connecting application without requiring the user to enter a username and password. The user can start a new MDM service session without signing on, and has full access to the secure services offered through the MDM service without any further authentication.

ZSO Prior Art:

ZSO for a secure web service is currently implemented in several different ways. It is typically implemented with a custom connecting application created as part of an MDM system. The application includes a set of one or more software libraries designed to establish a secure connection with the MDM service. The MDM service has corresponding secure-connection libraries so that the special application and the MDM service can communicate with each other to establish a secure connection without any input from the application user.

A user installs the connecting application to a device, then uses the connecting application to connect to the MDM service and use the services provided there. The connecting application, when first connecting to the MDM service, requires the user's username and password to make a secure connection. Once the user is authenticated the first time, no further authentication is required. Whenever the user uses the connecting application to start a new session with the MDM service, the application uses API calls to establish a secure connection without requiring any user input.

Using a custom connecting application for ZSO has a significant drawback: it requires users to find the application online, install the application, and then learn to use the application on their devices. Many users do not want to use a custom application to connect to web services. They find it easier to use a standard web browser which is typically already installed on a device and very familiar to the user.

It is possible to implement something very similar to ZSO on a web browser through the use of a persistent cookie that the MDM service (or any web service) creates during an initial session. The browser stores the cookie even after the session ends and/or the browser quits. When the user initiates a new session with the service, the browser supplies the service's persistent cookie back to the service, which recognizes the cookie and starts a new session without requiring authentication from the user.

This is not a true form of ZSO because persistent cookies have an expiration date (a week or so, for example) after which the user will have to log in again before starting a session. If the user deletes the cookie, which can easily happen when performing a mass cookie deletion to fix connection problems, the user will have to log in again. Cookie connections are also not as secure as security certificate connections: there are no cookie authorities to ensure authenticity. Cookies cannot be used when higher levels of authentication are required.

A web service may implement ZSO with user certificates, issuing a user certificate and accompanying authority certificate to a browser during an initial session. The browser stores both certificates where they remain even after the session ends and/or the browser quits. When the user initiates a new session with the service, the service requests the certificate pair. The browser returns the certificate pairs, which the service recognizes. The service then starts a new session without requiring authentication from the user.

This implementation can work as long as there are not too many certificates stored in the browser, but that is not usually the case in the real world. A browser accumulates certificates, often without the browser user's knowledge, as the user connects to different web services. When the user asks the browser to connect to the MDM service, the service requests the certificates, and the browser does not know which certificate pair to provide. When this happens, the browser asks the user to identify the correct certificate, which the user may not know. Even if the user does know which certificate to identify, the request becomes, in effect, an authentication request and the session is no longer a ZSO session.

SUMMARY OF THE INVENTION

This invention works with a standard browser on any Internet-connected device (a mobile phone, notepad, or desktop computer, for example). That is, unlike the prior art, the invention does not require a special application normally required for ZSO. When a user on the device enrolls the device with a web service employing the invention, the invention configures all standard browsers on the device so as to enable ZSO via each standard browser installed on the device. After configuration, any of the browsers can create an authenticated secure connection to the web service without any participation on the part of the user other than pointing the browser to the web service. Specifically, the connection requires no authentication such as a user name and/or password. From the user's point of view, the user simply requests the web service in the browser (through a URL or a link), in a manner similar to connecting to a non-secure web service, and receives a connection with no further input: zero sign-on for the service.

DETAILED DESCRIPTION OF THE INVENTION

This invention implements an enrollment agent that an MDM or other service downloads to a device. The agent configures browsers on the device to correctly handle user certificates. The invention also implements a custom certificate authority maintained by the MDM service to guarantee the MDM service's own user certificates. The invention provides a special MDM service ZSO URL that correctly challenges a standard web browser to provide a user certificate in a way that guarantees ZSO for the user.

Figure 1:
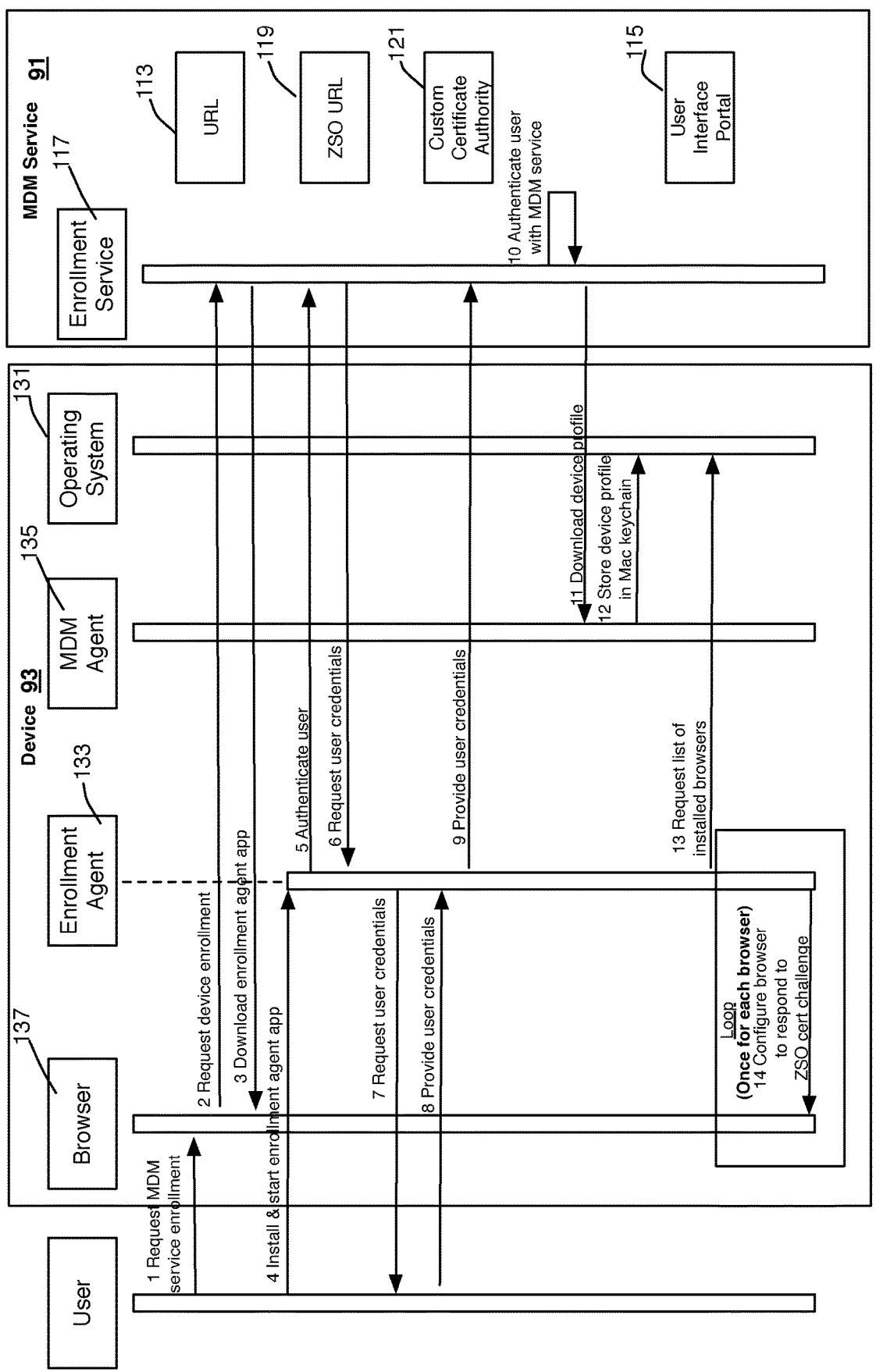
FIG. 1 shows the system elements and steps employed by a user who has a device that the user wants to enroll with an MDM service according to the invention.

As shown in FIG. 1, the invented MDM system has components both within an MDM service 91 and on an enrolled device 93.

The MDM service 91 contains standard MDM features that include a URL 113 where a browser requests connection and a user interface portal 115 to offer a set of SaaS applications or other secure web services to which a user may connect without further user-required authentication. The MDM service also contains the following invention components.

An enrollment service 117 that downloads an enrollment agent 133 (described later) to a device 93 when a device's owner asks to enroll the device in the MDM service. The enrollment service also communicates with the enrollment agent once the agent runs, and supplies user and authority certificates to enable ZSO connections.

A ZSO URL 119 which is a secondary URL for web browser connections. Once a device is enrolled, when a browser on the device requests connection to the primary URL, the MDM service redirects the browser to the ZSO URL, which challenges the browser in the correct way to receive the user certificate required to make a ZSO connection.

A custom certificate authority 121 that guarantees user certificates provided by the MDM service, but that are not recognized by services other than the MDM service.

The enrolled device 93 may be a mobile device that includes operating systems 131 such as iOS, Android®, or other mobile OSs. It may also be a computer or other device running operating systems such as Windows®, Macintosh®, UNIX®, or other operating systems that support a Public Key Infrastructure (PKI).

The invention uses the following additional components on the enrolled device 93.

The enrollment agent 133 is an application that the device owner can download from the MDM service or from a third-party service such as the Apple® App Store or Google® Play. When the enrollment agent runs, it finds browsers on the device and configures the browsers so that they will respond correctly to challenges from the MDM service's ZSO URL. The enrollment agent may also serve as the MDM agent (described below) to handle enrolling the device with the MDM service. The required configuration varies from browser to browser, but the specific configuration required is well within the abilities of persons having ordinary skill in the art based on the descriptions provided herein.

The MDM agent 135 enrolls the device with the MDM service. It downloads a user profile (a user certificate/authority certificate pair) from the MDM service's enrollment service 117 and installs them in the proper place(s) for later browser access. Some operating systems may provide their own MDM agent that the enrollment agent will engage to handle MDM enrollment. If the operating system does not supply an MDM agent, the enrollment agent acts as the MDM agent to handle MDM enrollment.

One or more standard web browsers 137 such as Chrome®, Internet Explorer®, Safari®, or Firefox® provide connections to web services for the device user. The invention configures these browsers using standard procedures so that the browsers respond correctly to authentication challenges from the MDM service's ZSO URL. Each type of web browser typically requires a different kind of configuration.

The invention works a little differently on each operating system and with each type of web browser. This walk-through describes the invention as it works with the Chrome® web browser on a Macintosh® computer. The walkthrough notes some differences with other OSs and browsers as they occur such that implementation of the invention using other operating systems and/or browsers will be readily apparent to persons having ordinary skill in the field of the invention.

Device Enrollment:

The process begins when a user has a device 93 that they want to enroll with the MDM service 91. FIG. 1 shows the process as detailed in the following description.

1. The user requests MDM service enrollment in the browser 137 by entering the MDM URL 113.
2. The browser contacts the enrollment service 117 through the MDM service's public page and requests device enrollment.
3. The MDM service's enrollment service downloads the enrollment agent application 133 to the device through the browser.

This is one way that the user may install the enrollment agent. The user may also skip steps 1-3 and download the enrollment agent as an application from an external source such as Google® Play.

4. The user installs and starts the enrollment agent 133.
5. The enrollment agent contacts the MDM service's enrollment service 117 to authenticate the user.
6. The enrollment service requests user credentials from the enrollment agent 133.
7. The enrollment agent requests user credentials from the user.
8. The user provides credentials to the enrollment agent, typically a username and password.

If the enrollment service requires multi-factor authentication, the user may also have to supply additional information such as a fingerprint swipe or an externally-generated token.

9. The enrollment agent provides the user credentials to the enrollment service 117.
10. The enrollment service authenticates the user within the MDM service 91.
11. The enrollment service downloads to the user device's MDM agent a device profile that contains a user certificate for the user with an accompanying authority certificate issued by the MDM service's own certificate authority.

In other operating systems, the enrollment agent receives the device profile, then either triggers the resident MDM agent 135 to handle enrollment or acts as the MDM agent to handle MDM enrollment itself.

12. The MDM agent stores the user and authority certificates to a location where browsers on the device can find them—in this case for a Macintosh® computer, in the log-in keychain for the user provided by the Macintosh® operating system.
13. The enrollment agent requests a list from the operating system of the browsers installed on the device.
14. The enrollment agent configures each browser to respond correctly to the MDM service's ZSO URL's certificate challenge as follows.

In Chrome®, it adds a policy setting named AutoSelectCertificateForUrls that contains the ZSO URL and the certificate (stored in the keychain) to present when connecting to the ZSO URL returns a challenge requesting a certificate.

In Firefox®, it stores the two certificates directly in Firefox®'s standard certificate storage where the challenge will find them.

In Safari®, it uses the Keychain API to set a certificate preference that ties the ZSO URL to the user certificate.

For other browsers, although the specifics will differ, the implementation details would be based on one or more of the specifics provided for Chrome®, Firefox® and Safari® browsers.

Device Connection

Figure 2:
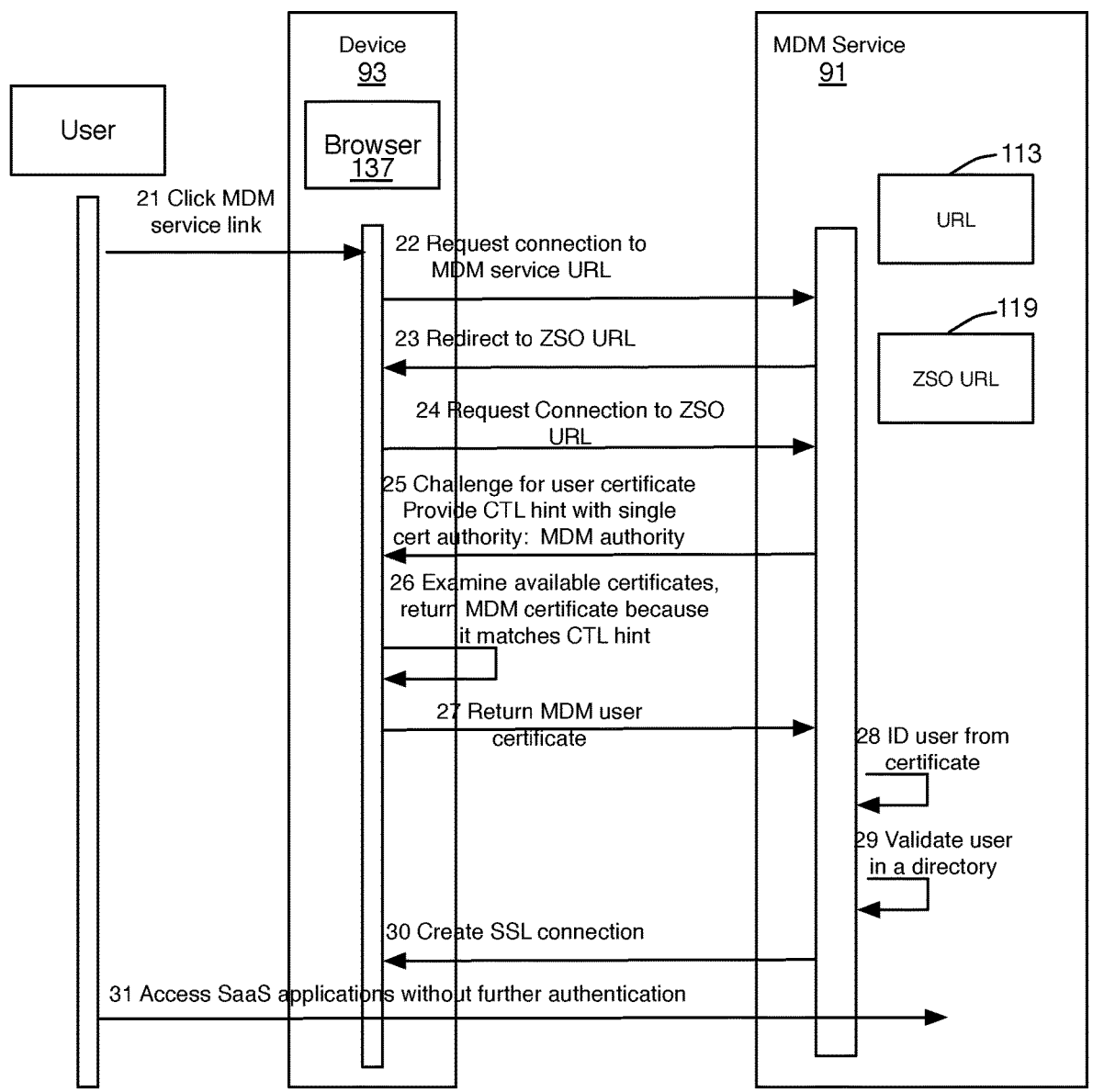
FIG. 2 shows the system elements and steps employed by a user once a device is enrolled, to use a pre-configured browser to connect to the MDM service's URL at any time.

Once a device 93 is enrolled, the user may use any of the pre-configured browsers to connect to the MDM service's URL at any time as explained in detail below with reference to FIG. 2.

21. The user clicks the MDM service link in a browser or directly enters the URL 113 for the MDM service.
22. The browser connects to the MDM service's URL 113.
23. The MDM service redirects the browser to the ZSO URL 119.
24. The browser requests connection to the ZSO URL.
25. The MDM service responds to the ZSO request and challenges the browser for a user certificate. The MDM service accompanies the challenge with a hint (a standard option for a challenge) that supplies a CTL (certificate trust list) that contains a single authority: the MDM service's custom certificate authority.
26. The browser looks at the user certificates available to it and finds a single certificate that satisfies the CTL: the MDM service's user certificate. All other stored certificates are guaranteed by a different authority.

If the browser is Safari®, it does not recognize CTL hints. It does, however, recognize the ZSO URL and through previous configuration knows to return the MDM service's user certificate.

27. The browser returns the user certificate in response to the ZSO challenge.
28. The MDM service accepts the certificate and identifies the user from the certificate.
29. The MDM service looks up the user in its directory to ensure that the user is valid—for example, that the user account has not been disabled or deleted.
30. The MDM service accepts the user certificate and creates an SSL connection with the browser.
31. The user is signed onto the MDM service and can access any available SaaS applications or secure web service without providing any further authentication information.

In one embodiment, once the user is signed onto the MDM service, the MDM service lists available SaaS applications and the user can click on a desired one of the listed SaaS applications and then connect using standard authentication mechanisms handled completely by the MDM service. In another embodiment, at the initial step when the user clicks on the MDM service link in a browser, the MDM service serves as a front end or interface for a single SaaS application, so that the MDM URL acts as the SaaS application's URL. The user could bookmark the MDM URL as the application's URL, and then access the application directly by selecting the bookmarked application's URL.

Other implementations of the invention may occur on web services other than an MDM service. These web services may be a SaaS application or other type of service that provides a secure connection to a requesting browser using security certificates. These implementation work on the web services in much the same way as they work on an MDM service.

Other implementations of the invention may occur on non-Macintosh® platforms such as Windows® or UNIX®-based platforms. These implementations work in much the same way as the implementation just described.

An embodiment of the invention may be implemented as a machine-readable medium having stored thereon instructions which when executed cause a processor to perform operations as described above. In other embodiments the operations are performed by specific hardware components that contain hardwired logic. Those operations might alternatively be performed by any combination of programmed computer components and custom hardware components. The various elements used to implement the invention may be placed at a single location or they may be distributed at different locations, which components communicate with each other over physically connected wires or over any kind of wireless connection as well as any combination thereof.

A machine-readable medium as used herein includes any mechanism for storing or transmitting information in a form readable by any type of processing device which can execute instructions based on the transmitted information.

Although specific examples of how the invention may be implemented are described, the invention is not limited by the specified examples, and is limited only by the scope of the following claims.

We claim:

1. Method for enabling zero sign-on (ZSO) through a standard web browser comprising:
    enrolling a device which uses at least one standard web browser with a web service by:
    authenticating a user of said device using an enrollment service of said web service configured to receive from said device a request for authentication;
    said enrollment service sending a request for user credentials to an enrollment agent installed on said device;
    said enrollment service receiving from said enrollment agent, user credentials obtained from the user;
    said enrollment service authenticating the user with said web service using said obtained user credentials;
    said enrollment service downloading to said enrollment agent, a device profile that contains a user certificate for the user with an accompanying authority certificate issued by said web service, said enrollment agent for storing the user and authority certificates to a predetermined location on the device, and configuring each of said at least one standard web browsers on said device to respond correctly to ZSO Uniform Resource Locator (URL) certificate challenges from said web service, wherein said configuring comprises adding a policy setting which enables auto selecting of URL certificates that contain a ZSO URL, and the user certificate and authority certificate stored in a keychain to present when connecting to the ZSO URL returns a challenge requesting a certificate.

2. The method defined by claim 1 wherein said web service is a device management service.

3. The method defined by claim 1 wherein said web service downloads said device profile to said enrollment agent for storing said user and authority certificates to a predetermined location on said device.

4. The method defined by claim 1 wherein said web service downloads said device profile to a device management agent for storing said user and authority certificates to a predetermined location on said device.

5. The method defined by claim 1 wherein authentication further comprises said enrollment service requiring multi-factor authentication, and said web service sends to said enrollment agent a request for prompting said user to supply additional information including one of a fingerprint swipe and an externally-generated token.

6. Method for enabling zero sign-on (ZSO) using a standard web browser comprising:
    enrolling a device which uses at least one standard web browser with a web service by:
    an installed enrollment agent on said device sending a request to said web service to authenticate a user of said device;
    said installed enrollment agent receiving from an enrollment service of said web service a request for user credentials;
    said installed enrollment agent providing said requested user credentials to said enrollment service;
    after an authentication performed by said web service, said installed enrollment agent receiving from said web service a device profile including a user certificate for the user and an authority certificate issued by said web service;
    said device storing said user certificate and authority certificate at a device location accessible by each of said at least one standard web browsers;
    said installed enrollment agent configuring each of said at least one standard web browsers to respond correctly to a ZSO Uniform Resource Locator (URL) certificate challenge received from said web service, wherein said configuring comprises adding a policy setting which enables auto selecting of URL certificates that contain a ZSO URL, and the user certificate and authority certificate stored in a keychain to present when connecting to the ZSO URL returns a challenge requesting a certificate.

7. The method defined by claim 6 wherein said web service is a device management service.

8. The method defined by claim 6 wherein said policy setting is named AutoSelectCertificateForUrls.

9. The method defined by claim 6 wherein said configuring each of said at least one standard web browsers comprises storing the user certificate and authority certificate in a predetermined location for subsequent accessing by each of said at least one standard web browsers.

10. The method defined by claim 6 wherein said configuring each of said at least one standard web browsers comprises using a keychain application program interface (API) to set a certificate preference that ties a ZSO URL to the user certificate.

11. The method defined by claim 6 wherein said authentication comprises:

a) said enrollment agent contacting the web service's enrollment service to authenticate the user, said enrollment service for requesting user credentials from the enrollment agent;
b) said enrollment agent prompting the user to provide predetermined credentials to the enrollment agent;
c) said enrollment agent sending said provided predetermined credentials to said enrollment service.

12. The method defined by claim 11 wherein said predetermined credentials include a username and password.

13. The method defined by claim 11 wherein if the enrollment service requires multi-factor authentication, said enrollment agent prompting said user to supply additional information including one of a fingerprint swipe and an externally-generated token.

14. The method defined by claim 6 wherein said enrolling comprises:

a) said device sending a request to said web service to download said enrollment agent to said device;
b) said web service for processing said request and initiating a download of said enrollment agent;
c) said device downloading the enrollment agent from said web service, and after said downloading is complete, installing the enrollment agent on said device.

15. The method defined by claim 6 wherein said enrolling comprises:

a) said device sending a request to an external source to download said enrollment agent to said device;
b) said external source for processing said request and initiating a download of said enrollment agent
c) said device downloading the enrollment agent from said external source, and after said downloading is complete, installing the enrollment agent on said device.

* * * * *